United States Patent [19]

Matsushima et al.

[11] 4,452,927
[45] Jun. 5, 1984

[54] RESIN COATED SAND FOR SHELL MOLDING PROCESS

[75] Inventors: Noriaki Matsushima; Yukio Saeki; Yukio Tokunaga, all of Fujieda, Japan

[73] Assignee: Sumitomo Durez Company, Ltd., Tokyo, Japan

[21] Appl. No.: 455,705

[22] Filed: Jan. 5, 1983

[30] Foreign Application Priority Data

Jan. 7, 1982 [JP] Japan .................................. 57-1506

[51] Int. Cl.³ .............................................. C08K 5/05
[52] U.S. Cl. .................................... 523/147; 523/145
[58] Field of Search ................. 523/147, 145; 524/386

[56] References Cited

U.S. PATENT DOCUMENTS 2,662,067 12/1953 Less et al. ........................... 524/386
4,196,114 4/1980 Funabiki et al. .................... 523/145
4,250,076 2/1981 Golden et al. ...................... 523/145
4,252,700 2/1981 Funabiki et al. .................... 523/147

FOREIGN PATENT DOCUMENTS 54-139956 10/1979 Japan .................................. 524/386

Primary Examiner—Lewis T. Jacobs
Attorney, Agent, or Firm—James F. Tao; James F. Mudd

[57] ABSTRACT

Resin coated sand for foundry shell molding operations is provided which eliminates the cracking of the molds at the time of pouring. In conventional phenolic bonded sand molds, the abrupt thermal expansion caused by the pouring of the molten metal into the mold causes the mold to crack. The resin coated sand, in this invention, is composed of foundry sand or aggregates coated with a phenolic resin which has incorporated therein, a polyethylene glycol of high molecular weight. This improved coated sand eliminates cracking at pouring and does not impair the shake-out property of the molds.

9 Claims, 1 Drawing Figure

RESIN COATED SAND FOR SHELL MOLDING PROCESS

BACKGROUND OF THE INVENTION

This invention relates to resin coated sand for use in the preparation of molds for shell molding operations, and particularly in the improvement of the properties of the molds which prevent their cracking at the time of pouring. In conventional sand-molding operations, a mixture of sand coated with a binder is placed in the mold, and the heat of the processing steps causes reactions to occur between the binder components to improve the pressed strength of the sand and retain the configuration of the part to be cast. After introduction of the molten metal into the cavity, the heat of the metal, during the cooling cycle is transferred to the sandbinder mixture causing the binder to be destroyed to a degree that allows the sand to be removed from the cast metal in an efficient manner.

In the case of iron casting, the stock temperature of shell-mold reaches 800–1000° C. at pouring, and the strength of shell-mold is naturally reduced after casting because almost all the phenolic resin binder is subjected to thermal degradation by the intense heat at pouring. Accordingly it is easy to remove the mold-core from molded articles in the form of sand grains after casting.

Ordinary phenolic resins have been used in these products. They are prepared by mixing heated foundry sand or aggregates with resole type phenolic resins or with novolac type phenolic resins with hexamethylenetetramine.

Said novolac type phenolic resins are generally prepared by reacting 1 mole of phenols with 0.6 to 0.9 moles of aldehyde in the presence of acidic catalysts. The resole type phenolic resins are generally prepared by reacting 1 mole of phenols with 1 to 3 mole of aldehyde in the presence of basic catalysts.

However, there has been an obvious drawback in the conventional phenolic resins to prepare sand molds. The molds often crack at pouring when the phenolic resins are used as the binder. A certain stress occurs on account of an abrupt thermal expansion of coated sand because coated sand is subject to a considerable extent of heat at pouring. The molds are not durable against the stress, and they crack. This is a reason why conventional phenolic resins are disadvantageous as a foundry binder.

A known method to solve the problem to prevent the molds from cracking has been to incorporate cushioning substances into phenolic resins or coated sand obtained therefrom. This method can make the molds flexible as well as free from stress at heating and pouring. Said conventional cushioning substances are Vinsol, bisphenol A, petroleum resins, rosins, etc. While these substances play a role of cushioning effect in the molds to a certain extent, they have drawbacks in that they emit a disagreeable odor at pouring due to thermal decomposition or evaporation. Also, the molds containing such cushioning agents are essentially poor in the shake-out property.

After much investigation to conquer said drawbacks, the inventors hereof have found that the presence of polyethylene glycols with a high molecular weight prevent the molds from cracking at pouring, free from disagreeable odors, and the shake-out property of the molds are not impaired.

SUMMARY OF THE INVENTION

The object of this invention is to provide a resin coated sand for foundry shell molding operations that will eliminate the cracking of the molds at the time of pouring. The resin coated sand is prepared by coating foundry sand or aggregates with a phenolic resin which has incorporated therein a polyethylene glycol having a number average molecular weight range of 1,500 to 40,000 and more preferably 5,000 to 20,000. The polyethylene glycol being incorporated into the phenolic resin at a ratio of 0.5 parts to 40 parts per 100 parts of phenolic resin.

DETAILED DESCRIPTION OF THE INVENTION

Figure 1:
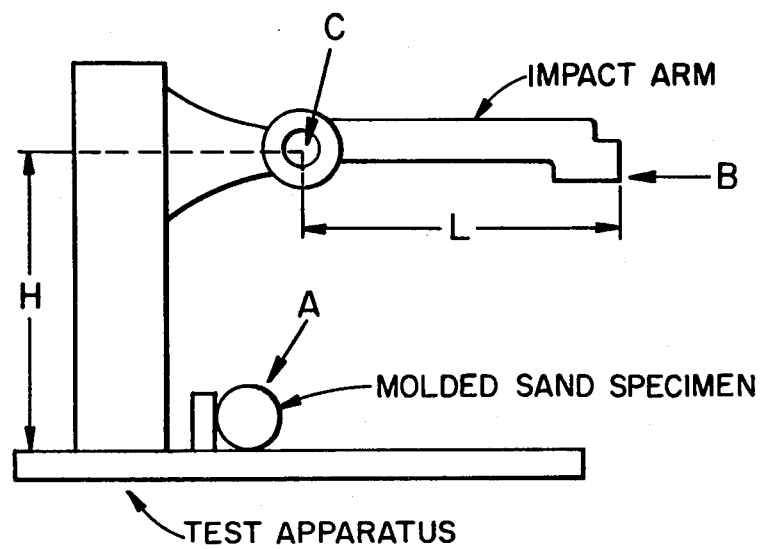
FIG. 1 is a side view of the test device used to determine the shake-out property of the cured resin coated sand.

The inventors have found that the incorporation for polyethylene glycols with a high molecular weight into a phenolic resin will produce a binder for foundry sand that will inhibit cracking of the prepared molds at the time of metal pouring. They have also discovered that this resin coated sand will not impair the shake-out properties of the molds.

The shake-out property is defined as the removal of the molded metal object from the mold upon cooling. The heat generated by pouring the molten metal into the mold will degrade or destroy the phenolic resin binder to a degree that upon cooling, the resin-sand mixture that remains, can be easily removed by tapping or flogging.

The phenolic resins used in the present invention are any of the novolac, the resole type or a mixture thereof. Phenols for preparing said phenolic resins are phenol, craesol, xylenol, etc., however, they are usable in the presence of resorcin, cathercol, hydroquinone, aniline urea, melamine, cashew nut shell oil, etc. Formaldehyde for preparing said phenolic resins is selected from formalin, paraformaldehyde, trioxane, etc. Catalysts for the reaction of phenol and formaldehyde are one or more of acidic substances generally such as oxalic, hydrochloric and sulfuric acid, and organic metal salts for novolac type resin preparation. Basic substances used as catalysts for resole type resin preparation are generally selected from primary amines such as ammonia and diethyldiamine; secondary amines such as ethylene diamine and diethyldiamine; tertiary amines such as triethylamine; hydroxides of alkali metals such as sodium hydroxide and potassium hydroxide; and hydroxide of alkali earth metals such as calcium hydroxide and magnesium hydroxide.

Polyethylene glycols according to the present invention are particularly those having a number average molecular weight range of 1,500 to 40,000, and more preferably 5,000 to 20,000.

When the average molecular weight is less than 1,500, the ability of preventing the molds from cracking is impaired and the stick point of resin coated sand obtained is lowered. When it is more than 40,000, the initial strength of the molds is damaged.

The most preferable incorporating proportion range of polyethylene glycols is 0.5 to 40 parts by weight into 100 parts by weight of phenolic resins. When it is less than 0.3 parts by weight, it prevents the molds from cracking. When it is more than 40 parts by weight, it impairs the initial strength of the molds.

The proper time for incorporating polyethylene glycols during the process of preparing phenolic resin is optional: at the beginning, during or after reacting phenols with formaldehyde. Alternatively, after preparing said solid phenolic resin, polyethylene glycols are incorporated thereinto by mix-grinding or melt-mixing with a kneading machine such as an extruder. It is also possible to incorporate the polyethylene glycols during the resin coated sand producting steps; the proper time for incorporating polyethylene glycols thereinto is optional: prior to, during or after adding the phenolic resin thereinto. Polyethylene glycols are incorporated either as they are, or as dispersed in a medium. Any incorporating method reduces the abrupt thermal expansion of shell-molds obtained from resin coated sand thus produced.

Lubricants can be added to the sand-phenolic mixture. They are the conventional ones, however, preferable are ethylene bis-stearic amide, methylol stearic amide. Lubricant-containing phenolic resins can be obtained by adding said lubricant to phenolic resins at any stage of their preparation; prior to, during or after the reaction.

Methods for producing resin coated sand in the present invention may be by any of the following methods: commercial hot-coating, semi-hot-coating, cold-coating, and powder-solvent coating, however, hot-coating is preferably recommended for the present invention.

The inventors will explain the present invention by the following nonlimitative Examples and Comparative Examples, wherein "parts" and "percent" indicate "parts by weight" and "percent by weight", respectively.

Preparation Examples 1, 2, 3 and 4

To a reaction kettle with a reflux cooler and a stirrer, 1,000 parts of phenol, 650 parts of 37% formalin, and 10 parts of oxalic acid were charged. The temperature of the mixture was gradually elevated, and upon reaching 96° C., refluxing continued for 120 minutes. 10 parts of methylene bis-stearic amide and 100 parts of the following polyethylene glycol (1) were added thereto. After the mixture was well mixed, it was dehydrated under vacuum and discharged from the kettle. Thus, a lubricant-containing novolac type phenolic resin was obtained.

Except for changing the kind of polyethylene glycols from the following (I) to (II), (III) and (IV), respectively, the same operations were run, and each novolac type phenolic resin was obtained: Preparation Polyethylene glycols used in each Preparation Example

| Example | No. | Trade Name* | Ave. Mol. Wt. |
|---------|-----|-------------|---------------|
| 1 | I | "PEG" 600 | 600 |
| 2 | II | "PEG" 1,540 | 1,540 |
| 3 | III | "PEG" 6,000 | 6,000 |
| 4 | IV | "PEG" 20,000 | 20,000 |

*All are products of Sanyo Kasei Koghy Co., Ltd.

Preparation Examples 5 and 6

To a reaction kettle with a reflux cooler and a stirrer, 1,000 parts of phenol, 1,795 parts of 37% formalin, 160 parts of 28% aqueous ammonia, and 60 parts of 50% sodium hydroxide solution were charged. The temperature of the mixture was gradually elevated, and upon reaching 90° C., refluxing continued for 30 minutes. 40 parts of ethylene bis-stearic amide and 110 parts of polyethylene glycol (III) were added. After the mixture was well mixed, it was dehydrated under vacuum, discharged from the kettle and chilled quickly. Thus, a lubricant-containing solid resole type phenolic resin was obtained as Preparation Example 5. The same operation was run by changing the quantity of polyethylene glycol (III) from 110 to 165 parts, another solid resole type phenolic resin was obtained as Preparation Example 6.

Preparation Example 7

To a reaction kettle with a reflux cooler and a stirrer, 1,000 parts of phenol, 650 parts of 37% formalin, and 10 parts of oxalic acid were charged. The temperature of the mixture was gradually elevated, and upon reaching 96° C., refluxing continued for 30 minutes. 10 parts of methylene bis-stearic amide were added thereto. After the mixture was well mixed, it was dehydrated under vacuum, and discharged from the kettle. Thus 970 parts of a novolac type phenolic resin was obtained.

Preparation Example 8

To a reaction kettle with a reflux cooler and a stirrer, 1,000 parts of phenol, 1,795 parts of 37% formalin, 160 parts of 28aqueous ammonia, and 60 parts of 50% sodium hydroxide solution were charged. The temperature of the mixture was gradually elevated, and upon reaching 96° C. refluxing continued for 30 minutes. 40 parts of methylene bis-stearic amide were added thereto. After the mixture was well mixed, it was dehydrated under vacuum, discharged from the kettle, and chilled quickly. Thus, 1,100 parts of a solid resole type phenolic resin was obtained.

Example 1

Preheated at 130° to 140° C., 7,000 parts of Sanei No. 6 silica sand were charged into a whirl-mixer. After 140 parts of novolac type phenolic resin obtained according to Preparation Example 1 were added thereto, it was mixed for 40 seconds, and 21 parts of hexmethylene tetramine dissolved in 105 parts of water were added thereto. The mixture was further mixed until it crumbled. Successively, 7 parts of calcium stearate were added thereto, and after 30 seconds of mixing, discharged and aerated, producing resin coated sand.

Example 2

Except for using novolac type phenolic resin obtained according to Preparation Example 2, resin coated sand was obtained by the same conditions of Example 1.

Example 3

Except for using novolac type phenolic resin obtained according to Preparation Example 3, resin coated sand was obtained by the same conditions of Example 1.

Example 4

Except for using novolac type phenolic resin obtained according to Preparation Example 4, resin coated sand was obtained by the same conditions of Example 1.

Example 5

Preheated at 130° to 140° C., 7,000 parts of Sanei No. 6 silica sand were charged into a whirl-mixer. After 140 parts of resole type phenolic resin obtained according to Preparation Example 5 thereto, it was mixed for 40 seconds, and 105 parts of cooling water were added thereto. The mixture was further mixed until it crumbled. Successively 7 parts of calcium stearate were added thereto, mixed for 30 seconds, discharged and aerated, obtaining a resin coated sand.

Example 6

Except for using resole type phenolic resin obtained according to Preparation Example 6, resin coated sand was obtained by the same conditions of Example 5.

Example 7

Preheated at 130° to 140° C., 7,000 parts of Sanei No. 6 silica sand were charged into a whirl-mixer and successively 130 parts of novolac type pehnolic resin obtained according to Preparation Example 7 were added thereto. Followed by 20 seconds of mixing, 13 parts of polyethylene glycol (III) were added thereto. After mixing it for 20 seconds, 21 parts of hexamethylene tetramine dissolved in 105 parts of water were added thereto. The mixture was further mixed until it crumbled. 7 parts of calcium stearate was added thereto, followed by 30 seconds of mixing. The mixture was discharged and aerated producing a resin coated sand.

Example 8

Preheated at 130° to 140° C., 7,000 part of Sanei No. 6 silica sand were charged into a whirl-mixer. After 13 parts of polyethylene glycol (IV) were added thereto, it was mixed for 20 seconds. Successively 78 parts of lubricant-containing novolac type phenolic resin according to Preparation Example 7 and 52 parts of resole type phenolic resin according to Preparation Example 8 were added thereto, and mixed well for 20 seconds. Then, 13 parts of hexamethylene tetramine dissolved in 63 parts by weight of water were added thereto. The mixture was mixed until it crumbled. 7 parts of calcium stearate were added thereto, mixed for 30 seconds, discharged and aerated, producing a resin coated sand.

Comparative Example 1

Preheated at 130° to 140° C., 7,000 parts of Sanei No. 6 silica sand were charged into a whirl-mixer. After 140 parts of novolac type phenolic resin, obtained according to Preparation Example 7, were added thereto, it was mixed for 40 seconds, and 21 parts of hexamethylene tetramine dissolved in 105 parts of water were added. The mixture was mixed until it crumbled. 7 parts of calcium stearate were added thereto, mixed for 30 seconds, discharged and aerated obtaining a resin coated sand.

Comparative Example 2

Preheated at 130° to 140° C., 7,000 parts of Sanei No. 6 silica sand were charged into a whirl-mixer. After adding 140 parts of resole type phenolic resin, obtained according to Preparation Example 8, it was mixed for 40 seconds, and 105 parts of cooling water were added thereto. The mixture was mixed until it crumbled. 7 parts of calcium stearate were added thereto, mixed for 130 seconds, discharged and aerated obtaining a resin coated sand.

Table 1 indicates the characteristics of various kinds of resin coated sand obtained according to Examples, 1, 2, 3, 4, 5, 6, 7 and 8, and Comparative Examples 1 and 2 as well as the abrupt thermal expansion rate and the shake-out property of shell-molds obtained therefrom.

TABLE 1

| | | Example | | | | | | | | Comparative Example | |
|---|---|---|---|---|---|---|---|---|---|---|---|
| | | 1 | 2 | 3 | 4 | 5 | 6 | 7 | 8 | 1 | 2 |
| Preparation Example (phenolic resin used) | | 1 | 2 | 3 | 4 | 5 | 6 | 7 | 7 + 8 | 7 | 8 |
| Polyethylene glycols | | I | II | III | IV | III | III | III | IV | — | — |
| Weight proportion of polyethylene glycol to 100 parts of phenolic resin | | 10 | 10 | 10 | 10 | 10 | 15 | 10 | 10 | 0 | 0 |
| Coated sand | Stick point (°C.) | 97 | 100 | 101 | 102 | 97 | 96 | 101 | 99 | 102 | 98 |
| Shell-mold | Bending strength (Kg/cm$^2$) | 32.5 | 32.3 | 32.1 | 30.8 | 29.5 | 29.7 | 32.2 | 30.1 | 31.0 | 29.0 |
| | Tensile strength under heat (Kg/cm$^2$) at 250° C. 30 sec. | 2.3 | 2.3 | 2.4 | 2.3 | 1.8 | 1.7 | 2.3 | 2.0 | 2.5 | 1.9 |
| | 60 sec. | 4.8 | 5.0 | 5.1 | 5.2 | 3.0 | 3.1 | 5.0 | 4.4 | 5.1 | 3.1 |
| | 90 sec. | 7.9 | 8.1 | 8.1 | 8.2 | 6.5 | 6.6 | 8.1 | 7.5 | 8.2 | 6.6 |
| | Abrupt thermal expansion rate (%) | 1.15 | 0.85 | 0.83 | 0.84 | 1.01 | 0.97 | 0.82 | 0.91 | 1.48 | 1.60 |
| | Shake-out property (times) | 30 | 32 | 31 | 31 | 28 | 27 | 31 | 29 | 31 | 27 |

Test Methods

Bending strength:
  according to JACT Method SM-1
Stick point:
  according to JACT Method C-1
Tensile strength under elevated temperature:
  according the JACT Method SM-10
Abrupt thermal expansion rate:
  according to JACT Method SM-7 at 1,000° C.
Shake-out property:
  Preparation of specimen:
    Coated sand is fed into an iron pipe of 29 mm in diameter and 150 mm in length. After 30 minutes of baking, it is covered with aluminum foil and further heated for 3 hours at 370° C. After cooling, the sand molded is taken out from the pipe.
  Test Method:

The specimen is flogged by the impact arm of the apparatus illustrated in FIG. 1. Crumbled sand is removed from the pipe after each flogging. Weighing the residual molded sand of the specimen until it becomes zero, the shake-out property is defined by the number of floggings.

Test apparatus:

In FIG. 1, A is a molded sand specimen and B is the arm which revolves around pivot C set at 30 cm high. Said arm is at first set horizontally, and then allowed to drop so as to flog said specimen.

We claim:

1. Resin coated foundry sand comprising foundry aggregates coated with phenolic resin, having incorporated therein a polyethylene glycol having a number average molecular weight range of about 1,500 to about 40,000, at a ratio of 0.5 to 40 parts polyethylene glycol per 100 parts phenolic resin.

2. Resin coated foundry sand according to claim 1, further comprising a lubricant.

3. Resin coated foundry sand according to claim 1, wherein said phenolic resin is a resole phenolic resin.

4. A resin coated foundry sand according to claim 3, further comprising a lubricant.

5. A resin coated foundry sand according to claim 1, wherein the phenolic resin is a novolac phenolic resin.

6. A resin coated foundry sand according to claim 5, further comprising a lubricant.

7. A resin coated foundry sand according to claim 1, wherein the phenolic resin is a mixture of novolac and resole phenolic resins.

8. A resin coated foundry sand according to claim 7, further comprising a lubricant.

9. A resin coated foundry sand comprising foundry aggregate coated with a phenolic resin, having incorporated therein a polyethylene glycol having a number average molecular weight range of about 5,000 to about 20,000; at a ratio of 0.5 to 40 parts per 100 parts phenolic resin, and a lubricant.

* * * * *